United States Patent
Gohshi

(10) Patent No.: US 9,495,732 B2
(45) Date of Patent: Nov. 15, 2016

(54) IMAGE ENHANCING DEVICE AND IMAGE ENHANCEMENT METHOD

(71) Applicant: KEISOKU GIKEN CO., LTD., Yokohama-shi, Kanagawa (JP)

(72) Inventor: Seiichi Gohshi, Tokyo (JP)

(73) Assignee: KEISOKU GIKEN Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/124,374

(22) PCT Filed: Jun. 6, 2013

(86) PCT No.: PCT/JP2013/003570
§ 371 (c)(1),
(2) Date: Dec. 6, 2013

(87) PCT Pub. No.: WO2014/024373
PCT Pub. Date: Feb. 13, 2014

(65) Prior Publication Data
US 2014/0334742 A1    Nov. 13, 2014

(30) Foreign Application Priority Data

Aug. 9, 2012   (JP) ................................. 2012-177466

(51) Int. Cl.
G06K 9/40   (2006.01)
G06T 5/00   (2006.01)
H04N 5/14   (2006.01)
(Continued)

(52) U.S. Cl.
CPC .............. *G06T 5/003* (2013.01); *H04N 1/4092* (2013.01); *H04N 5/142* (2013.01); *H04N 5/208* (2013.01); *G06T 2207/20192* (2013.01)

(58) Field of Classification Search
None
See application file for complete search history.

(56) References Cited

U.S. PATENT DOCUMENTS 8,427,256 B2 *   4/2013   Gohshi ....................... 333/28 R
8,655,101 B2 *   2/2014   Gohshi ......................... 382/275
(Continued)

FOREIGN PATENT DOCUMENTS

WO    WO 2010/113342 A1    10/2010
WO    WO 2011/061958 A1    5/2011
(Continued)

OTHER PUBLICATIONS

Jul. 9, 2013 Search Report issued in International Patent Application No. PCT/JP2013/003570 (with translation).
(Continued)

*Primary Examiner* — Feng Niu
(74) *Attorney, Agent, or Firm* — Kenja IP Law PC

(57) ABSTRACT

An image is sharpened by using a frequency component higher than Nyquist frequency.
An image enhancing device 1 according to an embodiment of the present invention for generating an output image by sharpening an input image, includes: a filter unit 10 configured to generate a first signal by eliminating at least a direct current component of a frequency component included in an input image signal representing the input image; a nonlinear processing unit 20 configured to generate a second signal by carrying out, to the first signal, nonlinear processing asymmetric between a positive area and a negative area of the first signal; a limiter 30 configured to generate a third signal by adjusting the second signal; and an adder 50 configured to generate an output image signal representing the output image by adding the third signal to the input image signal.

22 Claims, 12 Drawing Sheets

(51) Int. Cl.
  *H04N 5/208* (2006.01)
  *H04N 1/409* (2006.01)

(56) References Cited

U.S. PATENT DOCUMENTS

| | | | |
|---|---|---|---|
| 8,773,594 B2* | 7/2014 | Gohshi | 348/629 |
| 8,811,765 B2* | 8/2014 | Gohshi | 382/263 |
| 8,824,825 B2* | 9/2014 | Gohshi | 382/263 |
| 8,891,898 B2* | 11/2014 | Gohshi | 382/263 |
| 2009/0060312 A1* | 3/2009 | Kitamura | G06T 5/50 382/132 |
| 2012/0081198 A1* | 4/2012 | Gohshi | 333/28 R |
| 2012/0314969 A1* | 12/2012 | Furukawa et al. | 382/263 |
| 2014/0044376 A1* | 2/2014 | Gohshi | 382/263 |

FOREIGN PATENT DOCUMENTS

| | | |
|---|---|---|
| WO | WO 2011/099202 A1 | 8/2011 |
| WO | WO 2011/105377 A1 | 9/2011 |
| WO | WO 2012/043407 A1 | 4/2012 |

OTHER PUBLICATIONS

Jan. 15, 2013 Notification of Reasons for Refusal issued in Japanese Patent Application No. 2012-177466 (with translation).
Farsiu et al; "Fast and Robust Multiframe Super Resolution;" IEEE Transactions on Image Processing; Oct. 2004; vol. 13; No. 10; pp. 1327-1344.

* cited by examiner (A) Sin (B) S1

(C) S2

(D) Sout (A)

(B)

(C)

(A)

(B)

(C)

(D)

IMAGE ENHANCING DEVICE AND IMAGE ENHANCEMENT METHOD

CROSS REFERENCE TO RELATED APPLICATION

This application claims priority to and the benefit of Japanese Patent Application No. 2012-177466 (filed on Aug. 9, 2012), the entire contents of which are incorporated herein by reference.

TECHNICAL FIELD

The present invention relates to an image enhancing device and an image enhancement method for improving image quality by sharpening an image that are suitable for sharpening, for example, video displayed on a television set (TV) in real time.

BACKGROUND ART

Image enhancement processing for improving an image by sharpening the image has been hitherto known widely. For example, a conventional television set performs contour compensation for making rising and falling of a video signal, corresponding to a contour of a displayed image, steep. Such contour compensation improves visual image quality by extracting a high frequency component of an input image signal (a luminance signal), amplifying the high frequency component, and then adding the amplified high frequency component to the input image signal. FIG. 12 illustrates diagrams of changes in a waveform indicative of a signal level of an image subjected to the conventional image enhancement processing. FIG. 12(A) is a diagram illustrating a waveform of the signal level of the input image signal in a horizontal direction, particularly illustrating a waveform of a portion corresponding to an edge where the signal level changes in the horizontal direction. FIG. 12(B) illustrates a high frequency component extracted from the input image signal. By amplifying the high frequency component and adding the amplified high frequency component to the input image signal, an output image signal having steep rising of the edge as illustrated in FIG. 12(C) may be obtained.

In recent years, also, a technology called super-resolution for up-converting an input image into a high resolution output image and performing image enhancement processing to the up-converted image has been suggested (for example, see Non-Patent Document 1).

RELATED ART DOCUMENT

Non-Patent Document

Non-Patent Document 1: S. Farsiu, D. Robinson, M. Elad, and P. Milanfar, "Fast and Robust Multi-frame Super-resolution", IEEE Transactions on Image Processing, vol. 13, no. 10, pp. 1327-1344, October 2004.

SUMMARY OF INVENTION

Technical Problem

Since the conventional image enhancement processing is based on linear digital signal processing, a frequency component higher than a Nyquist frequency, namely, a frequency component higher than ½ of a sampling frequency of a target image may not be generated. Thus, it has not been allowed, for an image improvement, to sharpen the image by generating and using a frequency component higher than the Nyquist frequency.

For example, when a full-high vision television set (HDTV: High Definition Television, 1080×1920 pixels) enlarges and displays an image with an image signal for resolution under that for the HDTV, the displayed image blurs. Similarly, when an image signal with the resolution for HDTV is magnified to higher resolution (for example, 4K resolution about 4000×2000 pixels), the image is displayed in a blur. A reason for the image to blur is that the image signal subjected to magnification processing contains only frequency components up to as high as the Nyquist frequency of an original image before subjected to magnification and a frequency component near the Nyquist frequency of the magnified image is not contained.

The following is a description of a change in the frequency component due to magnification and enhancement processing of an image, with reference to FIG. 13. FIG. 13(A) illustrates a frequency spectrum of a digital image signal with a sampling frequency fs, and FIG. 13(B) illustrates a frequency spectrum of a digital image signal which is up-converted to double a pixel number in a horizontal direction. A sampling frequency Fbs after subjected to the magnification processing is twice the original sampling frequency fs (Fbs=2·fs). Here, as illustrated in FIG. 13(B), in the up-converted digital image signal, a frequency component does not exist between fs/2, corresponding to the Nyquist frequency of the original sampling frequency fs, and Fbs/2=fs, corresponding to the Nyquist frequency of the new sampling frequency Fbs.

FIG. 13(C) illustrates a frequency spectrum when the image enhancement processing by conventional linear digital signal processing is performed to the up-converted digital image signal. As illustrated in the figure, as subjected to the image enhancement processing by the linear digital signal processing, a frequency component near the original Nyquist frequency fs/2 is increased. By the image enhancement processing of the conventional linear digital signal processing, however, no frequency component higher than the original Nyquist frequency fs/2 is generated. Therefore, by the image enhancement processing of the conventional linear digital signal processing, as illustrated in FIG. 13(D), for example, no frequency component near a new Nyquist frequency Fbs/2 higher than the original Nyquist frequency fs/2 is generated. That is, it has not been allowed to generate and utilize a frequency component higher than the Nyquist frequency to the up-converted digital image signal, so as to sharpen the image and improve image quality.

Also, a conventional super-resolution technique described in Non-Patent Document 1 and the like performs the image enhancement processing by carrying out repetitive operations to a plurality of frames having the same sampling frequency and synthesizing high resolution pixels selected from each frame. Accordingly, some images may not be appropriately restored, possibly generating flickering such as sudden appearance of a failure image in a video. There has also been a problem that an operation amount using a plurality of frames is extremely large.

Accordingly, it is an object of the present invention to provide an image enhancing device and an image enhancement method that may sharpen an image without the repetitive operations to a plurality of frames by using a frequency component higher than the Nyquist frequency.

Solution to Problem

In order to solve the above problems, an image enhancing device according to an embodiment of the present invention for generating an output image created by sharpening an input image, including: a filter unit configured to generate a first signal by eliminating at least a direct current component of a frequency component included in an input image signal representing the input image; a nonlinear processing unit configured to generate a second signal by carrying out, to the first signal, nonlinear processing asymmetric between a positive area and a negative area of the first signal, wherein the nonlinear processing applied to the positive area of the first signal and the nonlinear processing applied to the negative area of the first signal are expressed by continuous functions passing through an origin, and wherein a band of a frequency component generated by the nonlinear processing is asymmetric between the positive area and the negative area; a limiter configured to generate a third signal by adjusting the second signal; and an adder configured to generate an output image signal representing the output image by adding the third signal to the input image signal.

Preferably, the image enhancing device further includes a switch unit; the nonlinear processing unit is configured to generate a plurality of types of second signals by carrying out, to the first signal, a plurality of types of nonlinear processing asymmetric between the positive area and the negative area of the first signal; the switch unit is configured to generate a fourth signal by selecting, for each pixel, one second signal from the plurality of types of second signals based on a signal level of the input image signal; and the limiter is configured to generate the third signal by adjusting the fourth signal.

Preferably, the switch unit, for a pixel with a signal level equal to or lower than a predetermined value, is configured to generate the fourth signal by selecting, from the plurality of types of second signals, a second signal with a large change rate in the positive area of the first signal.

Preferably, the switch unit, for a pixel with a signal level higher than the predetermined value, is configured to generate the fourth signal by selecting, from the plurality of types of second signals, a second signal with a large change rate in the negative area of the first signal.

Preferably, the image enhancing device further includes a switch unit which is configured to generate the fourth signal by selecting one of the first signal and the second signal for each pixel based on the signal level of the input image signal; and the limiter is configured to generate the third signal by adjusting the fourth signal.

Preferably, the switch unit, for a pixel with a signal level within a range between a predetermined upper limit and a predetermined lower limit, is configured to generate the fourth signal by selecting the second signal.

Preferably, the image enhancing device further includes an area filter configured to calculate, for each pixel of the input image signal, an average signal level of a predetermined area including surrounding pixels; and the switch unit is configured to generate the fourth signal based on the average signal level of each of the pixels.

Although a device is used as a solution according to the present invention as described above, methods and programs practically corresponding to the solution to be executed by a processor of the device, as well as storage media storing the programs may also substantialize the present invention and thus are included in the scope of the present invention.

For example, an image enhancement method substantializing the present invention as a method is used by an image enhancing device for generating an output image by sharpening an input image and includes: a step of generating a first signal by eliminating at least a direct current component of a frequency component included in an input image signal representing the input image; a nonlinear processing step of generating a second signal by performing, to the first signal, nonlinear processing asymmetric between a positive area and a negative area of the first signal, wherein nonlinear processing applied to the positive area of the first signal and the nonlinear processing applied to the negative area of the first signal are expressed by continuous functions passing through an origin, and a band of a frequency component generated by the nonlinear processing is asymmetric between the positive area and the negative area; an adjustment step of generating a third signal by adjusting the second signal; and a step of generating an output image signal representing the output image by adding the third signal to the input image signal.

Preferably, the image enhancement method further includes a switchover step; at the nonlinear processing step, a plurality of types of second signals are generated by carrying out, to the first signal, a plurality of types of nonlinear processing that are asymmetric between a positive area and a negative area of the first signal; at the switchover step, a fourth signal is generated by selecting, for each pixel, one second signal from a plurality of types of second signals based on a signal level of the input image signal; and, at the adjustment step, the third signal is generated by adjusting the fourth signal.

Preferably, at the switchover step, for a pixel with a signal level equal to or lower than a predetermined value, the fourth signal is generated by selecting, from the plurality of types of second signals, a second signal with a large change rate in the positive area of the first signal.

Preferably, at the switchover step, for a pixel with a signal level higher than the predetermined value, the fourth signal is generated by selecting, from the plurality of types of second signals, a second signal with a large change rate in the negative area of the first signal.

Preferably, the switchover step is further included, at which the fourth signal is generated by selecting, for each pixel, one of the first signal and the second signal based on the signal level of the input image signal; and, at the adjustment step, the third signal is generated by adjusting the fourth signal.

Preferably, at the switchover step, for a pixel with a signal level within a range between a predetermined upper limit and a predetermined lower limit, the fourth signal is generated by selecting the second signal.

Preferably, the image enhancement method further includes a step of calculating, for each pixel of the input image signal, an average signal level in a predetermined area including surrounding pixels; and, at the switchover step, the fourth signal is generated based on the average signal level of each of the pixels.

Effect of the Invention

According to the image enhancing device and the image enhancement method according to the present invention, without repetitive operations to a plurality of frames, an image may be sharpened by using a frequency component higher than a Nyquist frequency.

DESCRIPTION OF EMBODIMENTS

Embodiments of the present invention will be described in detail below with reference to the accompanying drawings.

(First embodiment)

Figure 1:
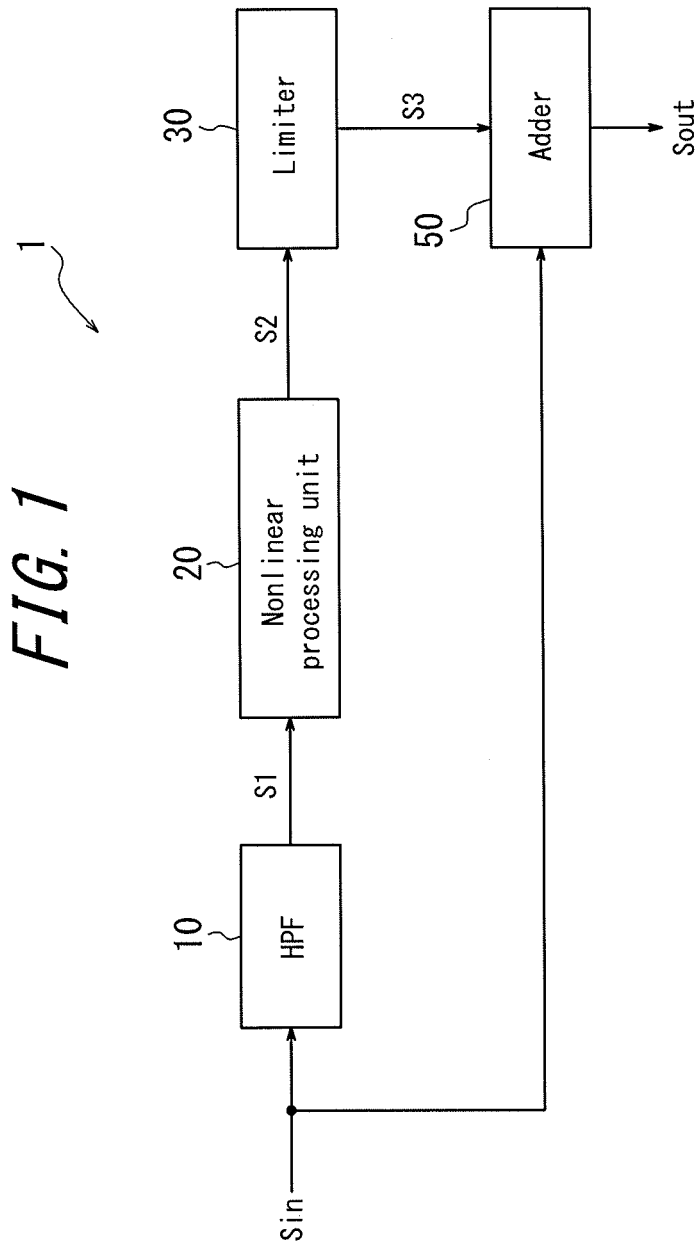
FIG. 1 is a diagram illustrating a configuration of an image enhancing device according to a first embodiment.

FIG. 1 is a block diagram illustrating a configuration of an image enhancing device 1 according to a first embodiment of the present invention. The image enhancing device 1, to an input image signal $S_{in}$ input from outside as a digital signal representing an image, carries out processing for sharpening the image represented by the input image signal $S_{in}$ (hereinafter, referred as "image enhancement processing" or simply as "enhancement processing"), and is provided with a high-pass filter (HPF) 10, a nonlinear processing unit 20, a limiter 30, and an adder 50.

The image represented by the input image signal $S_{in}$ may be either a still image or a video. When the input image signal $S_{in}$ represents a video, the video may be displayed in real-time by either a standard definition television (SDTV: Standard Definition Television) or a high definition television (HDTV: High Definition Television).

Figure 2:
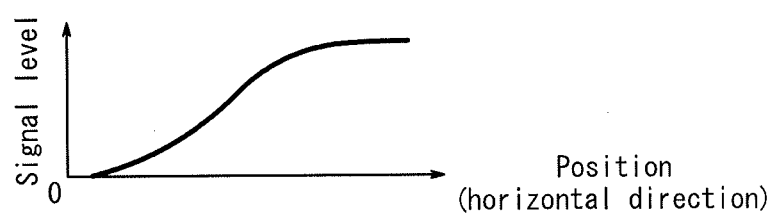
FIG. 2(A) to (D) are diagrams illustrating waveforms of a signal level of an image in a horizontal direction according to the first embodiment.
Figure 2:
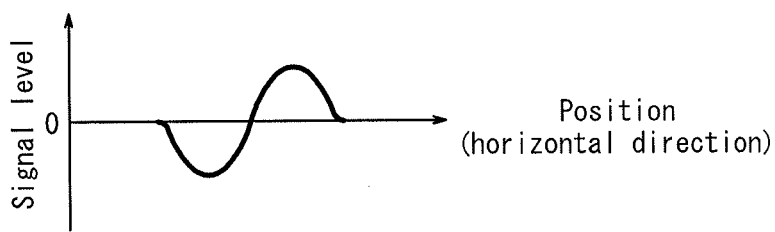
Figure 2:
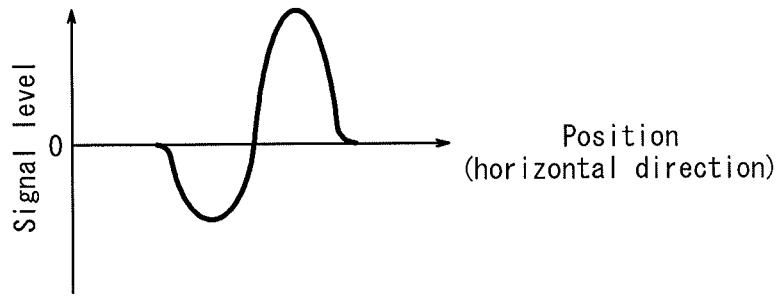
Figure 2:
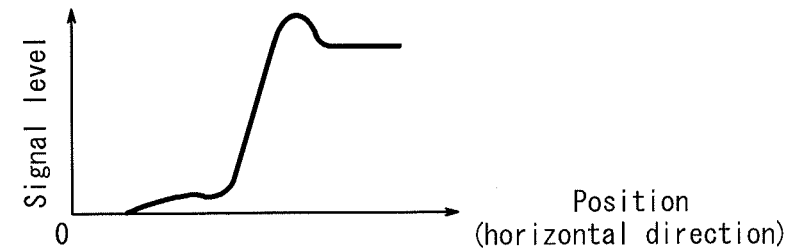

The following is a description of an operation of each unit and an output waveform, by using a waveform of a signal level (luminance value) of an image illustrated in FIG. 2 in a horizontal direction by way of example. Note that, although each unit will be described below in association with the waveform of the signal level of the image in the horizontal direction, each unit may carry out the image enhancement processing in a manner similar to that for the waveform of the signal level of the horizontal direction to a waveform of a signal level of the image in a vertical direction or a waveform of a signal level in a time direction between images of a video.

FIG. 2(A) is a diagram illustrating a waveform of a signal level of the input image signal $S_{in}$ in the horizontal direction, particularly illustrating a portion of the waveform corresponding to an edge where the signal level changes in the horizontal direction. Resolution of the input image signal $S_{in}$ corresponds to that of an output image signal $S_{out}$ and, when the resolution of the output image is higher than that of the original input image, it means that the input image signal $S_{in}$ is up-converted from the resolution of the original input image to the resolution of the output image signal $S_{out}$. For example, when the image enhancing device 1 outputs an image for the SDTV as an image for the HDTV, the input image signal $S_{in}$ is a signal converted to an image for the HDTV from the original image for the SDTV using the conventional linear conversion.

The HPF 10 generates a first signal S1, which is a high frequency signal, by eliminating at least a direct current component of a frequency component included in the input image signal $S_{in}$. Specifically, the HPF 10 extracts a high frequency component containing a contour component of the image represented by the input image signal $S_{in}$ and also extracts the first signal S1 in FIG. 2(B) from the input image signal $S_{in}$ in FIG. 2(A).

Figure 3:
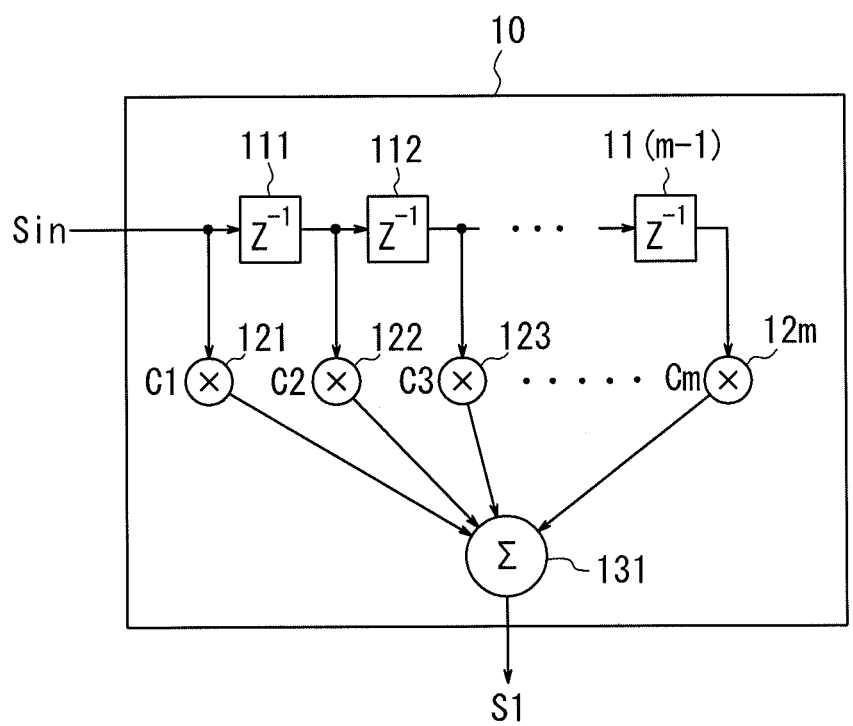
FIG. 3 is a diagram illustrating an example of a configuration of a high-pass filter.
Figure 4:
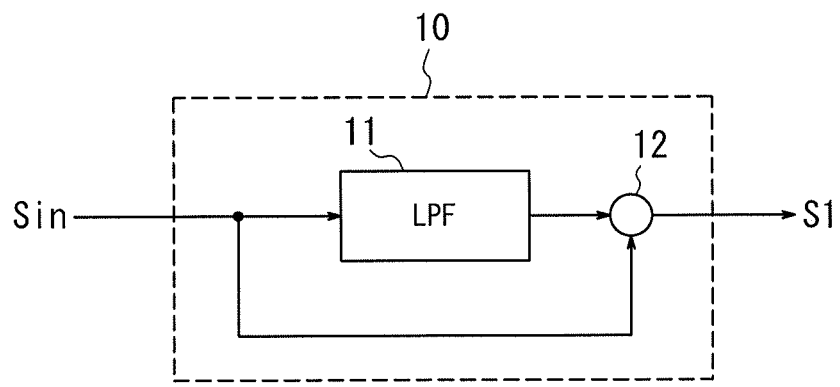
FIG. 4 is a diagram illustrating an example of a high-pass filter configured using a low-pass filter.

FIG. 3 is a block diagram illustrating a configuration of the HPF 10. As illustrated in FIG. 3, the HPF 10 may function as a transversal digital filter of an m taps (m represents a digit of 3 or more) constituted by an m−1 number of unit delay elements 111 to 11(m−1), an m-number of multiplier 121 to 12m, and one adder 131. In this case, each multiplier 12j (j=1 to m, the same shall apply hereinafter) multiplies an input signal by a coefficient Cj and outputs a result to the adder 131, where the coefficient Cj is set so as to allow the HPF 10 to extract the high frequency component including the contour component (for example, m=3, C1=0.5, C2=−1, C3=0.5). Note that, in general, it is easier to substantialize a low-pass filter than a high-pass filter. FIG. 4 is a diagram illustrating an example of the high-pass filter configured using the low-pass filter. The HPF 10 illustrated in FIG. 1 may be substantialized by a configuration using the low-pass filter (hereinafter, referred to as an "LPF") 11 and a subtracter 12 as illustrated in FIG. 4.

The nonlinear processing unit 20 generates a second signal S2 by carrying out, to the first signal S1, nonlinear processing asymmetric between a positive area and a negative area of the first signal S1. As illustrated in FIG. 2(B), the first signal S1 includes a contour component in a positive direction and a contour component in a negative direction. Here, the positive direction and the negative direction of the first signal S1 represent a white pixel direction and a black pixel direction, respectively. By employing different (asymmetric) nonlinear processing as opposed to the same (symmetric) nonlinear processing between the two directions, edge enhancement more conforming to human visual characteristics may be enabled. That is, the nonlinear processing unit 20 carries out different (asymmetric) nonlinear processing to the contour component of the first signal S1 in the positive direction and the contour component of the first signal S1 in the negative direction. Hereinafter, the nonlinear processing asymmetric between the positive area and the negative area of the first signal S1 is referred to as "asymmetric nonlinear processing".

Figure 5:
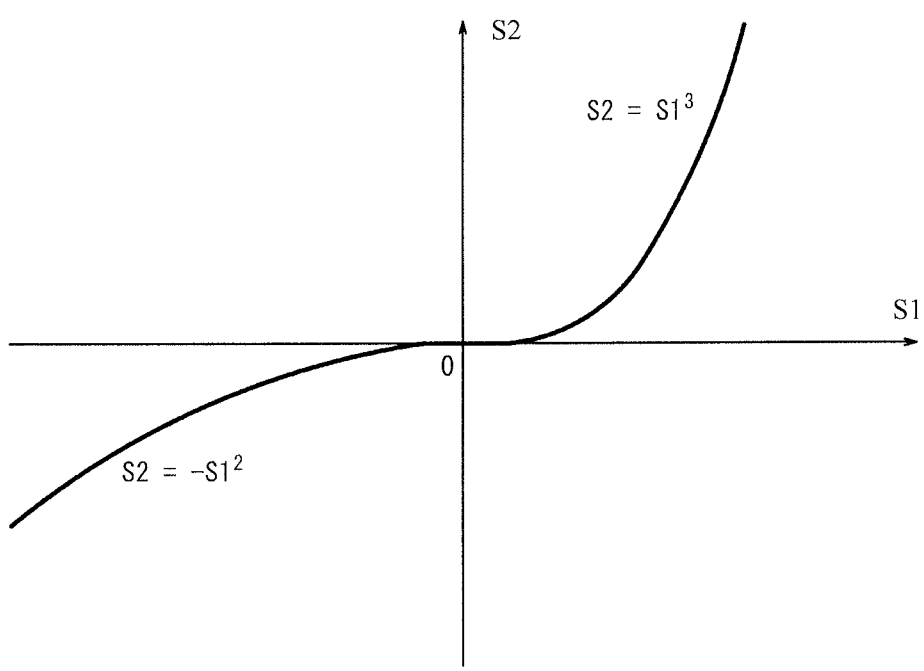
FIG. 5 is a diagram illustrating asymmetric nonlinear processing according to the first embodiment.

As the asymmetric nonlinear processing carried out by the nonlinear processing unit 20, as long as a value of the nonlinear processing used for the positive area and a value of the nonlinear processing used for the negative area are continuous around an origin (where the value is zero) of the first signal S1, any nonlinear processing may be combined together. According to the present embodiment, the nonlinear processing unit 20, as illustrated in FIG. 5, for example, generates the second signal S2 by cubing the first signal S1 (S2=S1$^3$) when the first signal S1 is positive, or squares the first signal S1 and changes its sign to negative (S2=−S1$^2$) when the first signal S1 is negative. FIG. 2(C) is a diagram illustrating a waveform of the second signal S2 subjected to the asymmetric nonlinear processing carried out by the nonlinear processing unit 20. As illustrated in the figure, a positive waveform of the second signal S2 is markedly amplified.

By the nonlinear processing asymmetric between the positive area and the negative area of the first signal S1 carried out by the nonlinear processing unit 20, image enhancement processing more conforming to human perception characteristics may be substantialized as described below. For example, as a rule based on the human senses, Weber-Fechner Law is known. When this law is applied to image recognition, it may be said that it is easier for humans to sense a contour in a low luminance area than a contour in a high luminance area. Accordingly, by employing, for example, processing of the nonlinear processing unit 20 to a pixel with a low signal level (luminance), the nonlinear processing unit 20 may amplify an edge enhancement component of the first signal S1.

Note that the asymmetric nonlinear processing carried out by the nonlinear processing unit 20 is not limited to the combination of the squaring operation and the cubing operation but may be other nonlinear processing. For example, the nonlinear processing in each of the positive area and the negative area of the first signal S1 may be expressed by Formula (1). The nonlinear processing of each processing unit includes all of power indexes of typical rational numbers represented by p/q. Note that, in such a power operation, whether the first signal S1 is positive or negative is maintained. For example, in a power operation of an even number (for example, squaring), when the first signal S1 is negative, a sign of a resulting value of the power operation is maintained as minus (for example, $S2=-S1^2$).

[Formula 1]

$$S2 = S1^{\frac{p}{q}} \quad (1)$$

Further, the nonlinear processing unit 20, as the asymmetric nonlinear processing, may use an appropriate combination of various nonlinear functions such as a trigonometric function (for example, S2=Sin (S1)), a logarithmic function (for example, S2=log(|S1|+1)), a gamma correction function (for example, $S2=S1^{1/2}$), and the like.

Also, the nonlinear processing unit 20 may perform nonlinear processing not represented by the general equation of the formula (1), by preliminarily holding an additional value for each signal level of the first signal S1 in a table and, for example, for an 8 bit signal level taking a value between a minimum value 0 and a maximum value 255, adding a value within a range of ±10 based on the signal level of the first signal S1.

The limiter 30 functions as a controller of amplitude (the signal level) of the second signal S2 and generates a third signal S3 by adjusting the second signal S2. Specifically, the limiter 30 carries out clip processing such that the amplitude of the second signal S2 is equal to or under a predetermined upper limit, or carries out a gain adjustment of a level of the second signal S2 by multiplying the second signal S2 by an invariable α (0≤α<1). Also, the limiter 30, in order to remove nose, may carry out rounding processing for rounding off the signal level of the second signal S2, equal to or lower than a predetermined value, to 0. The limiter 30 outputs the second signal S2 subjected to the clip processing, the gain adjustment, or the rounding processing as the third signal S3 to the adder 50.

The adder 50 generates the output image signal $S_{out}$ by adding the third signal S3 as a compensation signal for the sharpening of the image to the input image signal $S_{in}$. That is, an equation $S_{out}=S_{in}+S3$ is satisfied and, by adding the third signal S3 generated by adjusting the second signal S2 of FIG. 2(C) to the input image signal in FIG. 2(A), the adder 50 generates a signal subjected to the image enhancement processing illustrated in FIG. 2(D). A rising change of the edge portion of the output image signal $S_{out}$ is steeper than that of the edge portion of the input image signal $S_{in}$. That is, a sharper image than an original image represented by the input image signal $S_{in}$ may be obtained. Note that the adder 50 is provided with, as necessary, delay elements for adjusting timings between the input image signal $S_{in}$ and the third signal S3.

Since the image enhancing device 1 according to the present embodiment may compensate the high frequency area higher than the Nyquist frequency fs/2, which cannot be compensated by conventional image enhancing devices, the image enhancing device 1 is effective especially in improvement of image quality by sharpening an image represented by an image signal which has been subjected to the magnification processing. The following is a further detailed description about the feature that the nonlinear processing carried out by the nonlinear processing unit 20 enables compensation of the high frequency area higher than the Nyquist frequency fs/2.

Now, when it is assumed that the input image signal $S_{in}$ is expressed by a function f(x) at a position x (in the horizontal direction) and a fundamental angular frequency of the input image signal $S_{in}$ is represented by ω, the f(x) may be expressed by Fourier series as shown by Formula (2).

[Formula 2]

$$f(x) = a_{-N}\cos(-N)\omega x + a_{-N+1}\cos(-N+1)\omega x + \ldots + a_{-1}\cos(-1)\omega x + a_0 + a_1\cos\omega x + a_2\cos 2\omega x + \ldots + a_N\cos N\omega x + b_{-N}\sin(-N)\omega x + b_{-N+1}\sin(-N+1)\omega x + \ldots + b_{-1}\sin(-1)\omega x + b_1\sin\omega x + b_2\sin 2\omega x + \ldots + b_N\sin N\omega x \quad (2)$$

Here, N represents a degree of a harmonic of the highest frequency not higher than the Nyquist frequency fs/2 corresponding to a sampling frequency fs (before subjected to image magnification processing). That is, $$N\omega/(2\pi) < fs/2 \leq (N+1)\omega/(2\pi)$$

is satisfied.

From the above Formula (2), when g(x) replaces a part excluding a direct current portion $a_0$ of the input image signal $S_{in}$ represented by the function f(x) (hereinafter, also referred to as an "input signal f(x)), g(x) may be represented by Formula (3).

[Formula 3]

$$g(x) = a_{-N}\cos(-N)\omega x + a_{-N+1}\cos(-N+1)\omega x + \ldots + a_{-1}\cos(-1)\omega x + a_1\cos\omega x + a_2\cos 2\omega x + \ldots + a_N\cos N\omega x + b_{-N}\sin(-N)\omega x + b_{-N+1}\sin(-N+1)\omega x + \ldots + b_{-1}\sin(-1)\omega x + b_1\sin\omega x + b_2\sin 2\omega x + \ldots + b_N\sin N\omega x \quad (3)$$

The first signal S1 output from the HPF 10 includes a signal g(x) mentioned above or a high frequency component of the signal g(x) and, by the nonlinear processing unit 20, is subjected to the nonlinear processing asymmetric between the positive area and the negative area of the first signal S1.

For example, when the nonlinear processing unit 20 generates the second signal S2 by cubing the positive first signal S1, each member of the second signal S2 may be expressed by any one of the following formulas (4a) to (4d).

[Formula 4]

$$a_i \cos i\omega x \times a_j \cos j\omega x \times a_k \cos k\omega x \quad (4a)$$

$$a_i \cos i\omega x \times a_j \cos j\omega x \times b_k \sin k\omega x \quad (4b)$$

$$a_i \cos i\omega x \times b_j \sin j\omega x \times b_k \sin k\omega x \quad (4c)$$

$$b_i \sin i\omega x \times b_j \sin j\omega x \times b_k \sin k\omega x \quad (4d)$$

$$(i=\pm 1, \pm 2, \ldots, \pm N; j=\pm 1, \pm 2, \ldots, \pm N; k=\pm 1, \pm 2, \ldots, \pm N)$$

Now, by focusing on the following members in the member i=j=k=N expressed by the above formulas (4a) and (4d), for example, these members may be replaced as follows based on the formula of the trigonometric function.

[Formula 5]

$$(a_N \cos N\omega x)^3 = a_N^3\{(3/4)\cos N\omega x + (1/4)\cos 3N\omega x\} \quad (5a)$$

$$(a_N \sin N\omega x)^3 = b_N^3\{(3/4)\sin N\omega x - (1/4)\sin 3N\omega x\} \quad (5d)$$

Also, by focusing on the following members in the member i=j=k=−N expressed by the above formulas (4a) and (4d), for example, these members may be replaced as follows based on the formula of the trigonometric function.

[Formula 6]

$$\{a_N \cos(-N\omega x)\}^3 = a_N^3\{(3/4)\cos(-N\omega x) + (1/4)\cos(-3N\omega x)\} \quad (6a)$$

$$\{a_N \sin(-N\omega x)\}^3 = b_N^3\{(3/4)\sin(-N\omega x) - (1/4)\sin(-3N\omega x)\} \quad (6d)$$

From the above formulas (5a), (5d), (6a), and (6d), it can be seen that $(g(x))^3$ includes frequency components that are 3N times and −3N times of the fundamental angular frequency ω. Also, by rewriting other members of $(g(x))^3$ using the formula of the trigonometric function, it can be seen that $(g(x))^3$ includes various frequency components from −3N times of the fundamental angular frequency co to 3N times of the fundamental angular frequency ω.

Also, when the nonlinear processing unit 20 generates the second signal S2 by squaring the negative first signal S1 and making the S1 negative, each member of the second signal S2 may be expressed by any one of the following formulas (7a) to (7c).

[Formula 7]

$$a_i \cos i\omega x \times a_1 \cos j\omega x \quad (7a)$$

$$a_i \cos i\omega x \times b_j \sin j\omega x \quad (7b)$$

$$b_i \sin i\omega x \times b_j \sin j\omega x \quad (7c)$$

$$(i=\pm 1, \pm 2, \ldots, \pm N; j=\pm 1, \pm 2, \ldots, \pm N)$$

By using the formula of the trigonometric function, the above formulas (7a), (7b) and (7c) may be rewritten to the following formulas (8a), (8b) and (8c), respectively.

[Formula 8]

$$\frac{a_i a_j}{2}(\cos(i+j)\omega x + \cos(i-j)\omega x) \quad (8a)$$

$$\frac{a_i b_j}{2}(\cos(i+j)\omega x - \sin(i-j)\omega x) \quad (8b)$$

$$-\frac{b_i b_j}{2}(\sin(i+j)\omega x - \cos(i-j)\omega x) \quad (8c)$$

From the above formulas, since $(g(x))^2$ includes angular frequency components such as (N+1) ω, (N+2) ω, ..., 2Nω and the like, $(g(x))^2$ includes a frequency component higher than the Nyquist frequency fs/2. Therefore, the second signal S2 also includes a frequency component higher than the Nyquist frequency fs/2 such as a high frequency component as a frequency 2Nω/(2π).

Accordingly, when the image signal subjected to the image enlargement processing to double the pixel in the horizontal direction is input as the input image signal $S_{in}$ to the image enhancing device 1 according to the present invention, the input image signal $S_{in}$ passes through the HPF 10 and is subjected to the processing by the nonlinear processing unit 20, such that the second signal S2 including a frequency component higher than the Nyquist frequency fs/2 before subjected to the image enlargement processing is generated. The third signal S3 output by the limiter 30 also includes a frequency component higher than the Nyquist frequency fs/2 before subjected to the image enlargement processing. Accordingly, the output image signal $S_{out}$ generated by adding the input image signal $S_{in}$ and the third signal S3 as the compensation signal includes, in a similar manner, a frequency component higher than the Nyquist frequency fs/2 before subjected. As a result, a frequency spectrum of the output image signal $S_{out}$, as illustrated in FIG. 13(D), for example, exceeds the original Nyquist frequency fs/2 and a frequency component near a new Nyquist frequency Fbs/2 is generated.

According to the present embodiment, as described above, the nonlinear processing unit 20 generates the second signal S2 by carrying out the asymmetric nonlinear processing to the first signal S1; the limiter 30 generates the third signal S3 by adjusting the second signal S2; and the adder 50, by adding the third signal to the input image signal $S_{in}$, generates the output image signal $S_{out}$ representing the output image. Accordingly, without repetitive operations to a plurality of frames, the sharpening of an image may be achieved by using a frequency component higher than the Nyquist frequency.

Figure 13:
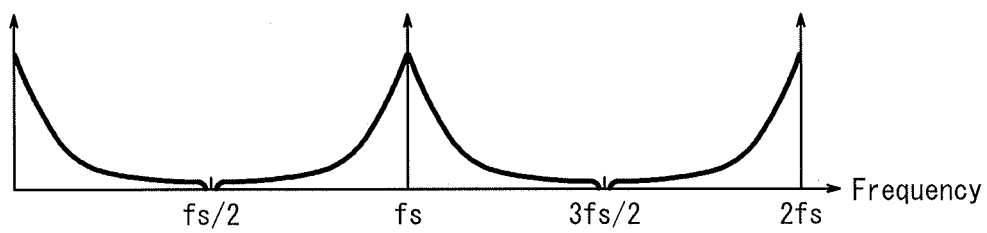
FIG. 13(A) to (D) are diagrams illustrating changes in a frequency component by enlargement and enhancement processing of an image.
Figure 13:
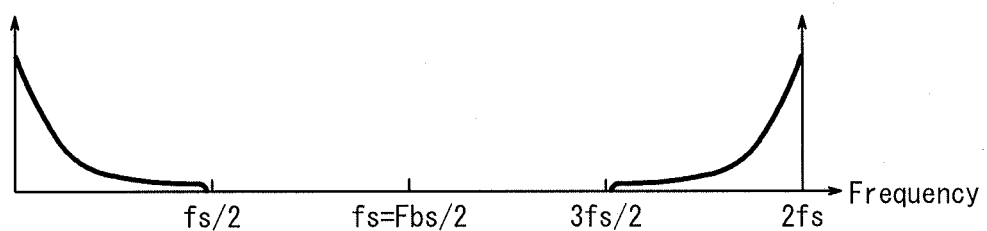
Figure 13:
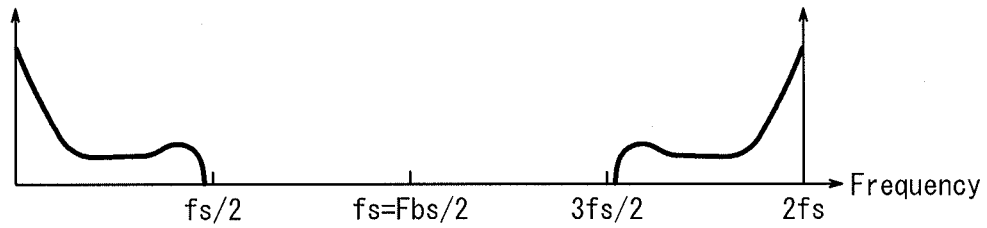
Figure 13:
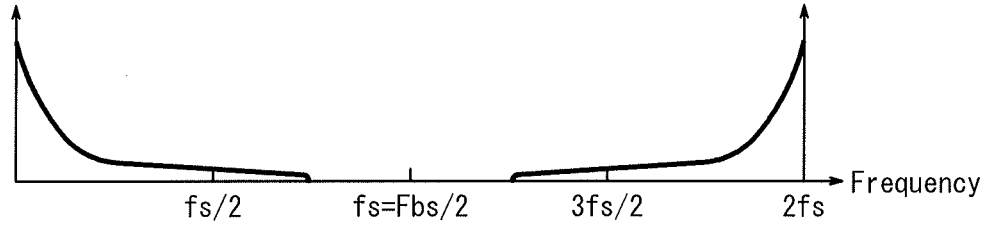

More specifically, the nonlinear processing unit 20 generates a high frequency component higher than the Nyquist frequency fs/2 such as a high frequency component in a frequency component of the input image signal $S_{in}$. By utilizing the high frequency component, the sharpening processing is carried out to the input image signal S. That is, when an image signal with a sampling frequency Fbs=2 fs is generated from a digital image signal with a sampling frequency fs subjected to the image enlargement processing and the image signal is used as the input image signal $S_{in}$, based on the processing by the nonlinear processing unit 20, the third signal S3 including a frequency component higher than the Nyquist frequency fs/2 corresponding to the original sampling frequency fs is generates as the compensation signal, and the third signal S3 is added to the input image signal $S_{in}$. Thereby, the frequency spectrum of the output image signal $S_{out}$ according to the present embodiment changes as illustrated in FIG. 13 (D) and includes a frequency component higher than the Nyquist frequency fs/2 before subjected to the magnification processing. Accordingly, comparing to an image subjected to the conventional image enhancing device, an image subjected to the enlargement processing may be sufficiently sharpened.

Also, since the image enhancing device 1 according to the present embodiment may be substantialized by a simple configuration illustrated in FIG. 1, application of the image enhancing device 1 to a full-high vision television set (HDTV) or a standard definition television set (SDTV) allows improvement in quality of a video displayed in real time as well as quality of a still image without great increase in cost.

Moreover, since the present embodiment enables compensation of a high frequency area higher than the Nyquist frequency fs/2 which cannot be compensated by the conventional image enhancing device, the present embodiment is effective particularly in improving image quality by sharpening the image represented by the image signal subjected to the magnification processing. For example, when a display of the full-high vision television set (HDTV) carries out the magnification processing to an image signal for the standard definition television set (SDTV) and displays a resultant image, the present embodiment is greatly effective as capable of significantly sharpening a video displayed in real-time by a simple configuration. Further, a technology of a display with 4000×2000 pixels (hereinafter referred to as a "4 k display"), which is more than the pixels of the HDTV, and a technology of television broadcast conforming to such a display have been in development. Accordingly, when the image signal for the HDTV is up-converted to be displayed on the 4 k display, the present embodiment is greatly effective as well, from the same point of view as that described above.

(Second embodiment)

Figure 6:
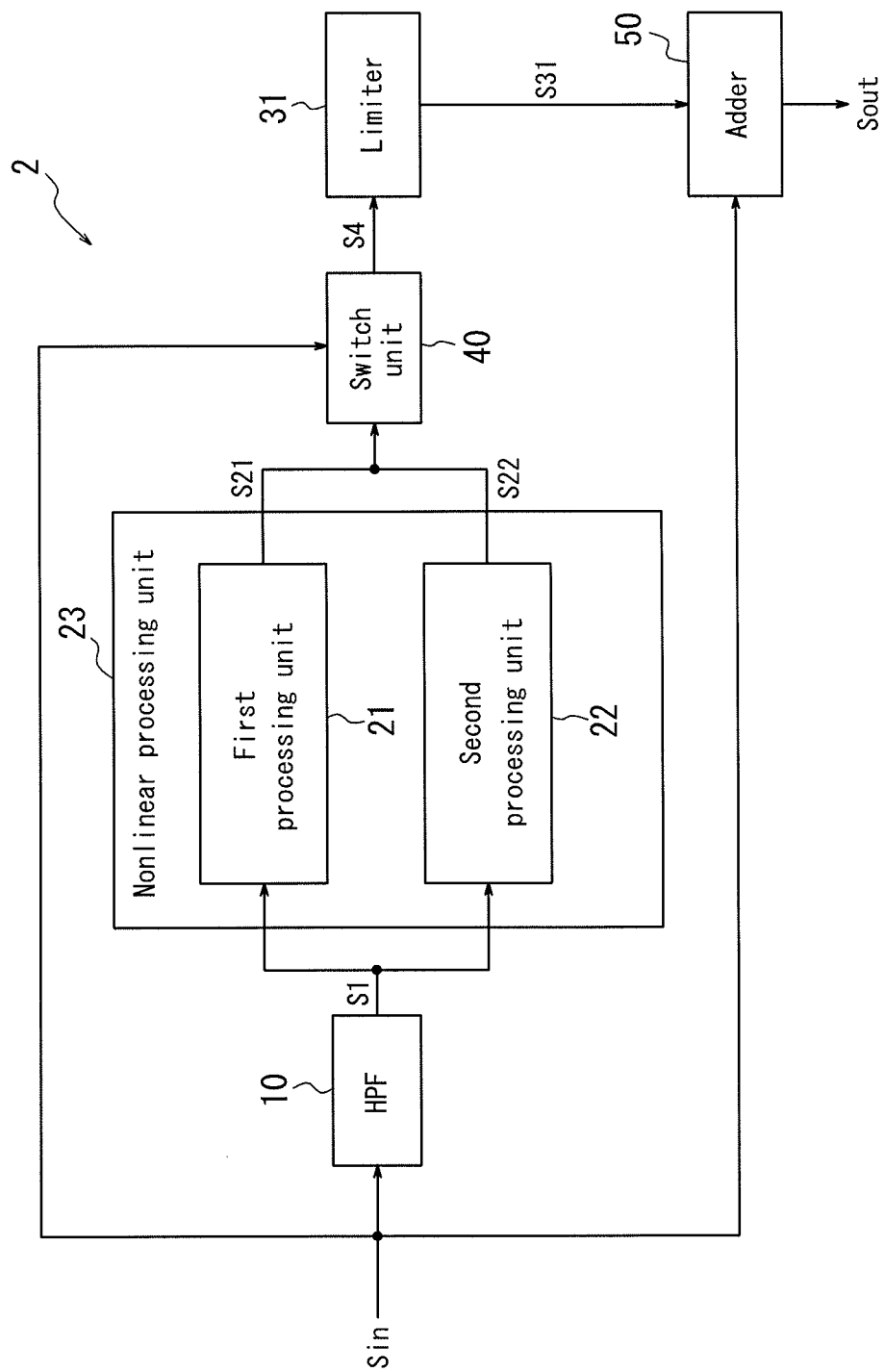
FIG. 6 is a diagram illustrating a configuration of an image enhancing device according to a second embodiment.

FIG. 6 is a block diagram illustrating a configuration of an image enhancing device 2 according to a second embodiment of the present invention. The image enhancing device 2 includes the high-pass filter (HPF) 10, a nonlinear processing unit 23, a switch unit 40, a limiter 31, and the adder 50. The following is a description of an operation of each unit and an output waveform, using a waveform of the signal level (luminance value) of an image illustrated in FIG. 7 in the horizontal direction, by way of example. Functional units given the same reference signs as those of the first embodiment carry out operations similar to those of the first embodiment, and detailed descriptions thereof according to the present embodiment will be omitted. For example, the HPF 10, in a manner similar to that of the first embodiment, generates the first signal S1 illustrated in FIG. 7(B) by extracting a high frequency component of the input image signal $S_{in}$ in FIG. 7(A).

The nonlinear processing unit 23 generates a plurality of types of second signals by carrying out a plurality of types of asymmetric nonlinear processing to the first signal S1. The nonlinear processing unit 23 according to the present embodiment includes a first processing unit 21 and a second processing unit 22 for carrying out different asymmetric nonlinear processing.

Figure 7:
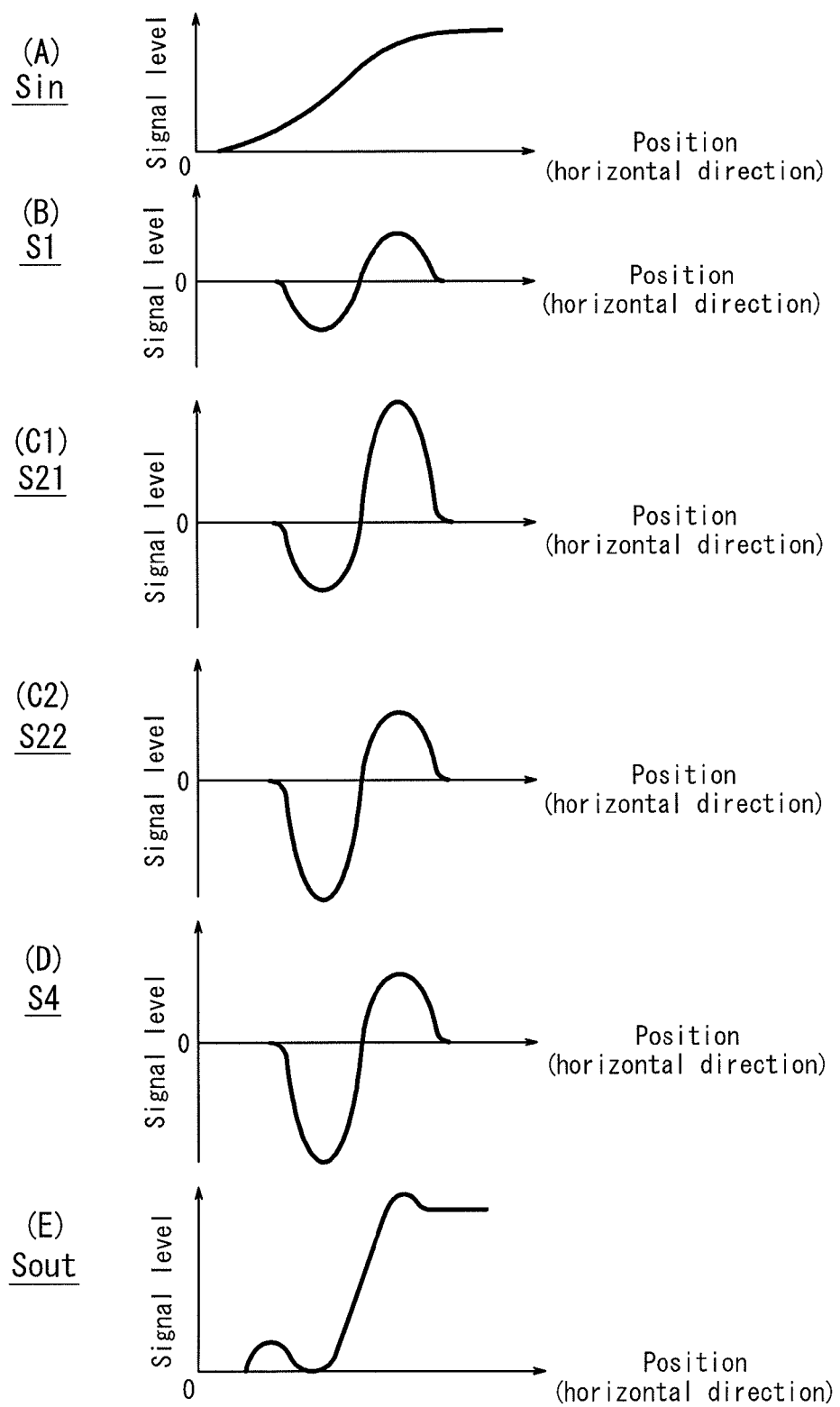
FIG. 7(A) to (E) are diagrams illustrating waveforms of a signal level of an image in a horizontal direction according to the second embodiment.
Figure 8:
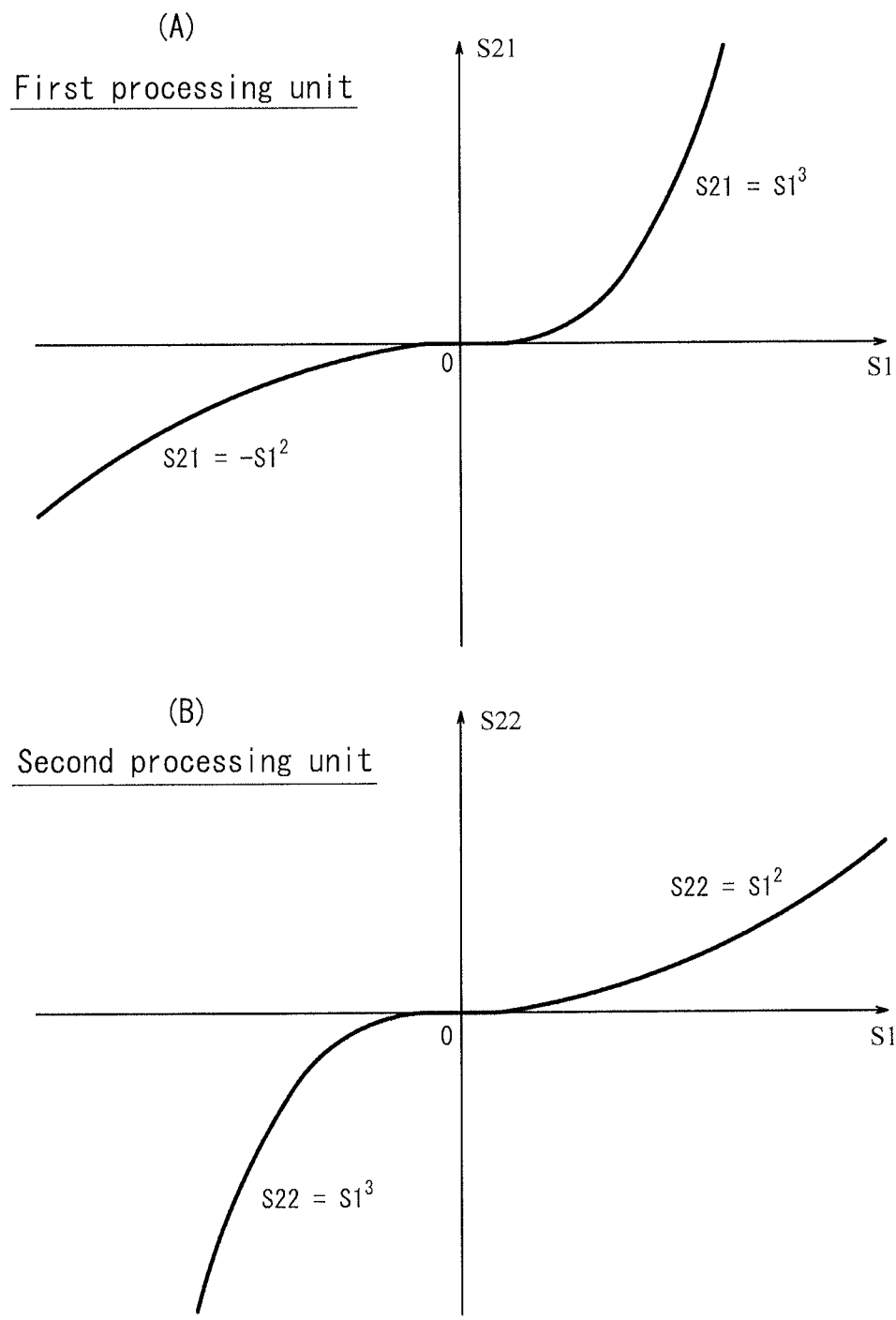
FIGS. 8(A) and (B) are diagrams illustrating asymmetric nonlinear processing according to the second embodiment.

For example, the first processing unit 21, as illustrated in FIG. 8(A), generates a second signal S21 by cubing the first signal S1 (S21=S1$^3$) when the first signal S1 is positive, or generates the second signal S21 by squaring the first signal S1 and changing the sign to negative (S21=−S1$^2$) when the first signal S1 is negative. FIG. 7(C1) is a diagram illustrating a waveform of the second signal S21 generated by the asymmetric nonlinear processing of the first processing unit 21. As illustrated in the figure, a positive waveform of the second signal S21 is amplified in a greater manner than a negative waveform of the second signal S21. Accordingly, application of the processing by the first processing unit 21 to, for example, a pixel with a low signal level (luminance) enables enhancement of an edge component of the first signal S1.

Also, the second processing unit 22, as illustrated in FIG. 8(B), for example, generates a second signal S22 by squaring the first signal S1 when the first signal S1 is positive (S22=S1$^2$), or generates the second signal S22 by cubing the first signal S1 (S22=S1$^3$) when the first signal S1 is negative. FIG. 7(C2) is a diagram illustrating a waveform of the second signal S22 subjected to the asymmetric nonlinear processing carried out by the second processing unit 22. As illustrated in the figure, a negative waveform of the second signal S22 is amplified in a greater manner than a positive waveform of the second signal S22. Accordingly, by adopting the processing by the second processing unit 22 to a pixel with a high signal level (luminance), for example, saturation and divergence of a value due to amplification are prevented and, also, an edge component of the first signal S1 of a pixel with a low luminance level may be enhanced.

The switch unit 40 generates the fourth signal S4 by selecting, for each pixel, one second signal from a plurality of types of second signals (S21, S22) based on the signal level of the input image signal $S_{in}$. Here, as described above, it is easier for humans to perceive an outline in a low luminance area than that in a high luminance area. That is, it is preferable, according to the human visual characteristics, to switch between control to an edge in a positive direction (white direction) and control to an edge in a negative direction (black direction) based on the signal level (luminance) of each pixel. Accordingly, in order to further enhance the outline in the low luminance area, the switch unit 40, for a pixel with a low signal level (luminance), selects the second signal S21 generated by the first processing unit 21 having a large change ratio in the positive area of the first signal S1 as the fourth signal S4. Also, the switch unit 40, for a pixel with a high signal level (luminance), in order to prevent saturation and divergence of the value due to amplification and also to enhance an edge component of a low luminance pixel, selects the second signal S22 generated by the second processing unit 22 having a large change rate in the negative area of the first signal S1 as the fourth signal S4. For example, when the input image signal $S_{in}$ is an 8 bit signal, the switch unit 40 outputs the second signal S21 from the first processing unit 21 as the fourth signal S4 to the limiter 31 for a pixel with a signal level between 0 and 127, or outputs the second signal S22 from the second processing unit 22 as the fourth signal S4 to the limiter 31 for a pixel with a signal level between 128 and 255. FIG. 7(D) is a diagram illustrating a waveform when the switch unit 40 selects the second signal S22 generated by the second processing unit 22 as the fourth signal S4.

The limiter 31 generates the third signal S31 by adjusting the fourth signal S4, and the adder 50 generates the output image signal $S_{out}$ by adding the third signal S31, as the compensation signal for the sharpening of the image, to the input image signal $S_{in}$.

According to the present embodiment, as described above, the nonlinear processing unit 23 generates the plurality of types of second signals (S21, S22) by carrying out a plurality of types of asymmetric nonlinear processing to the first signal S1; the switch unit 40 generates the fourth signal S4 by selecting, for each pixel, one of the second signals from the plurality of types second signals (S21, S22) based on the signal level of the input image signal $S_{in}$; the limiter 31 generates the third signal S31 by adjusting the fourth signal S4; and the adder 50 generates the output image signal $S_{out}$ representing the output image by adding the third signal S31 to the input image signal $S_{in}$. Accordingly, without repetitive operations to a plurality of frames, an image may be sharpened by using a frequency component higher than the Nyquist frequency.

In particular, the switch unit 40, based on the signal level of the input image signal $S_{in}$, selects one of the second signals of the plurality of types of second signals (S21, S22) for each pixel. That is, by changing the asymmetric nonlinear processing between each pixel, such as between a low luminance area of the input image and a high luminance area, the image enhancement processing suitable for each area may be carried out.

For example, the switch unit 40, for a pixel with a signal level equal to or lower than the predetermined value, generates the fourth signal S4 by selecting, from the plurality of types of second signals (S21, S22), a second signal with a large change ratio in the positive area of the first signal S1. Thereby, the image enhancement processing may be carried out conforming to the human perception characteristics that it is easier for humans to perceive an outline in a low luminance area than an outline in a high luminance area.

Also, for example, the switch unit 40, for a pixel with a signal level higher than the predetermined value, generates the fourth signal S4 by selecting, from the plurality of types of second signals (S21, S22), a second signal with a large change ratio in the negative area of the first signal S1. Thereby, the edge component of the first signal S1 of a pixel with a low luminance level is enhanced, thus the image enhancement processing may be carried out conforming to the human perception characteristics.

Note that the number of processing units included in the nonlinear processing unit 23 is not limited to two, but may be more than two. For example, the nonlinear processing unit 23 may include an n-number (n>2) of processing units such that each of the processing units carries out different asymmetric nonlinear processing. In this case, the switch unit 40 may manage an n−1 number of thresholds of a signal level and, based on each of the thresholds, select one processing unit to output the second signal thereof as the fourth signal S4. The more different types of the asymmetric nonlinear processing the nonlinear processing unit 23 carries out, the image enhancement processing with finer granularity conforming to each area of the input image may be substantialized. Also, the thresholds managed by the switch unit 40 do not need to evenly divide the signal level. For example, for a low luminance area which easily affects the human perception, the thresholds may be set at fine intervals for fine switchover of the asymmetric nonlinear processing, while a common asymmetric nonlinear processing may be carried out to a somewhat large area of a high luminance area.

(Third embodiment)

Figure 9:
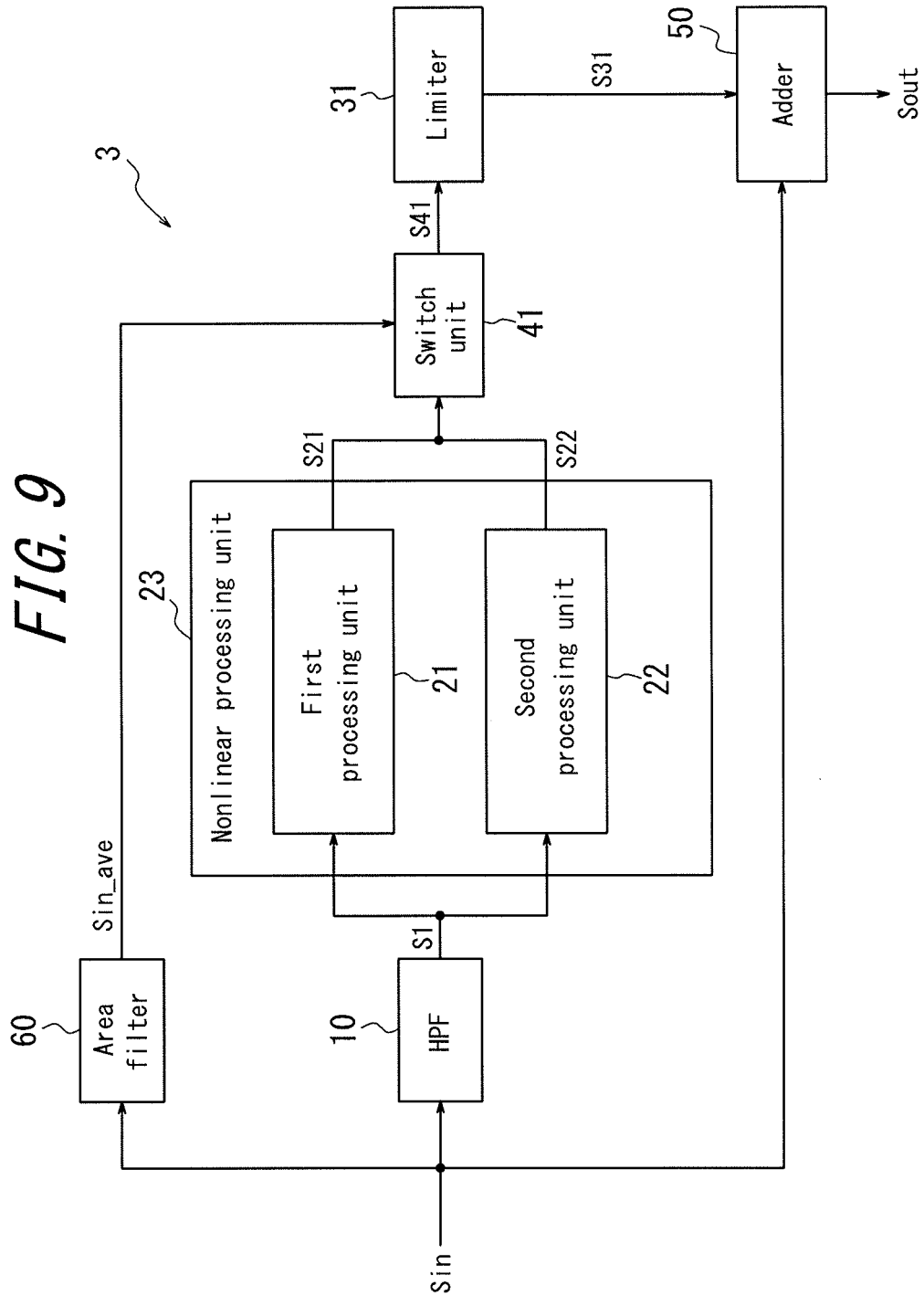
FIG. 9 is a diagram illustrating a configuration of an image enhancing device according to a third embodiment.

FIG. 9 is a block diagram illustrating a configuration of an image enhancing device 3 according to a third embodiment of the present invention. The image enhancing device 3 includes the high-pass filter (HPF) 10, the nonlinear processing unit 23, a switch unit 41, the limiter 31, the adder 50, and an area filter 60. Note that functional units given the same reference signs as those of the second embodiment carry out operations similar to those of the second embodiment, and detailed descriptions thereof according to the present embodiment will be omitted. For example, a waveform of each signal level of the image enhancing device 3 according to the present embodiment is similar to the waveform according to the second embodiment illustrated in FIG. 7.

The area filter 60, at the time of switchover between the second signal S21 generated by the first processing unit 21 and the second signal S22 generated by the second processing unit 22 for each pixel of the input image signal $S_{in}$, prevents occurrence of flickering due to a change in a luminance between adjacent pixels. According to the present embodiment, the area filter 60, for each pixel of the input image signal $S_{in}$, calculates an average signal level in a predetermined area including surrounding pixels and outputs the average signal level as an input image average signal $S_{in\_ave}$ to the switch unit 41. For example, the area filter 60 functions as a median filter for calculating an average signal level of a luminance of a predetermined area such as 3×3 pixels, 5×5 pixels, or 7×7 pixels, around each pixel of the input image signal $S_{in}$ and outputs the average signal level as the input image average signal $S_{in\_ave}$ to the switch unit 41. Here, the "average" may include, in addition to a simple average of the surrounding pixels, a weighting average taking weighting to each pixel into account.

The switch unit 41, based on the average signal level of each pixel of the input image average signal $S_{in\_ave}$, generates the fourth signal S41 by selecting one of the plurality of types of second signals (S21, S22).

According to the present embodiment, as described above, the switch unit 41 generates the fourth signal S41 based on the average signal level of each pixel, as opposed to a signal level of each pixel of the input image signal $S_{in}$. Since the average signal level functions as an average value of the signal levels in the predetermined area including the surrounding pixels, a possibility to select the second signal generated by different asymmetric nonlinear processing among adjacent pixels is reduced, which may suppress occurrence of flickering on a display. Also, the switch unit 41, by maintaining the second signal selected for the predetermined area for a predetermined period, for example, may further suppress the occurrence of flickering on the display.

(Fourth embodiment)

Figure 10:
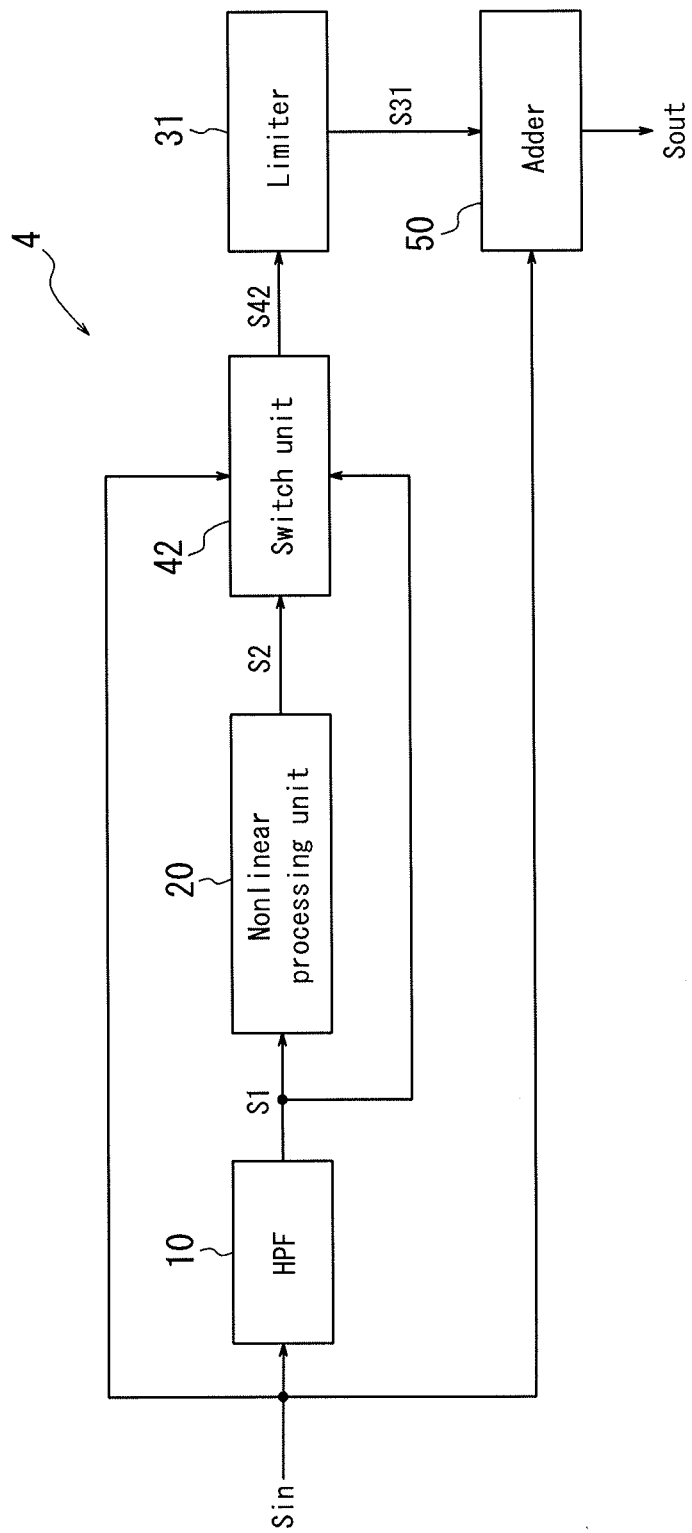
FIG. 10 is a diagram illustrating a configuration of an image enhancing device according to a fourth embodiment.
Figure 11:
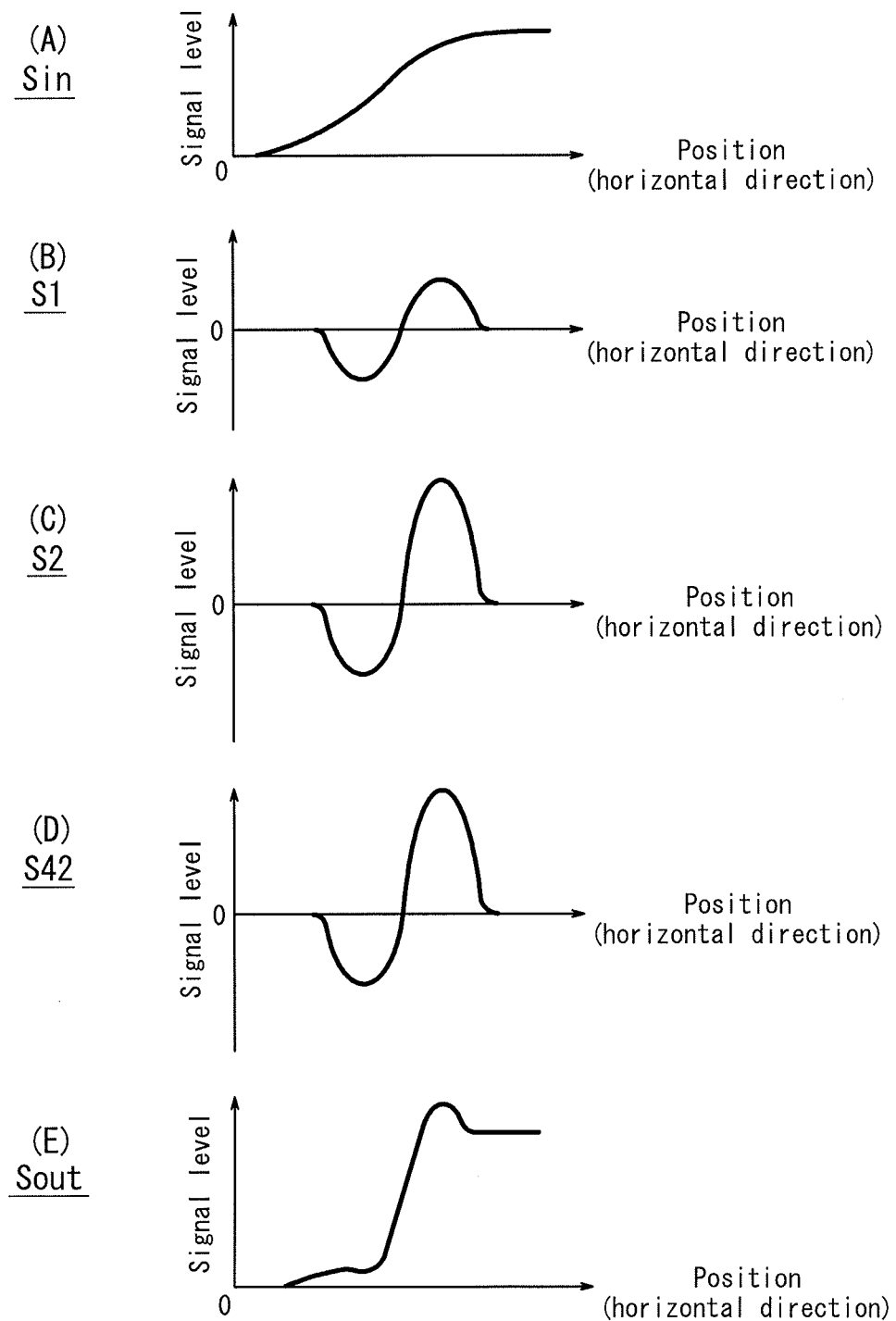
FIG. 11(A) to (E) are diagrams illustrating waveforms of a signal level of an image in a horizontal direction according to the fourth embodiment.
Figure 12:
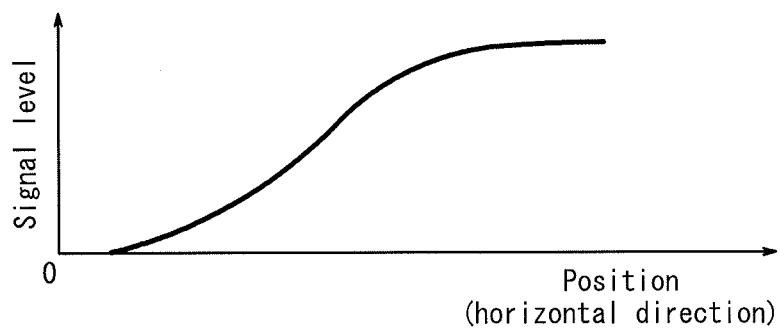
FIG. 12(A) to (C) are diagrams illustrating waveforms of a signal level of an image subjected to conventional image enhancement processing.
Figure 12:
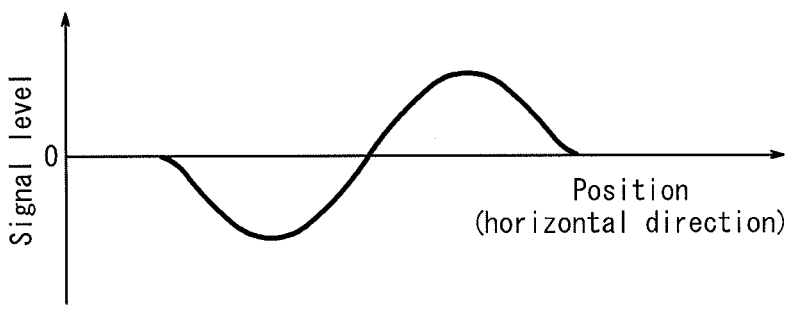
Figure 12:
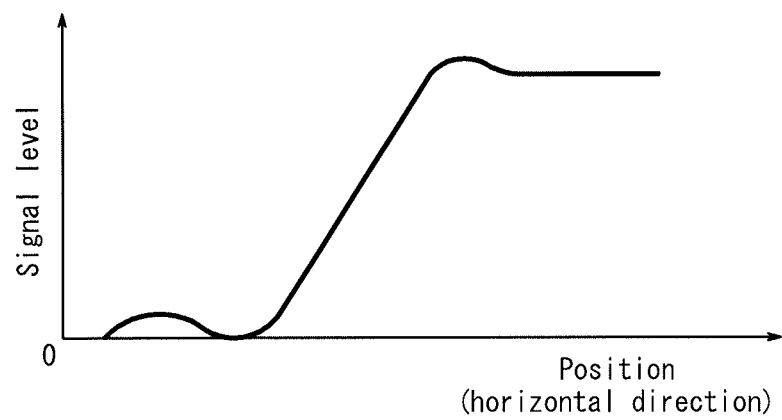

FIG. 10 is a block diagram illustrating a configuration of an image enhancing device 4 according to a fourth embodiment of the present invention. The image enhancing device 4 includes the high-pass filter (HPF) 10, the nonlinear processing unit 20, a switch unit 42, the limiter 31, and the adder 50. The following is a description of an operation of each of the units and an output waveform, using a waveform of a signal level (luminance) of an image illustrated in FIG. 11 in the horizontal direction, by way of example. Note that functional units given the same reference signs as those of the first embodiment carry out operations similar to those of the first embodiment, and detailed descriptions thereof according to the present embodiment will be omitted. For example, the HPF 10, in a manner similar to that of the first embodiment, generates the first signal S1 illustrated in FIG. 11(B) by extracting a high frequency component of the input image signal $S_{in}$ illustrated in FIG. 11(A). Also, the nonlinear processing unit 20 generates the second signal S2 illustrated in FIG. 11(C) by carrying out, to the first signal S1, the nonlinear processing asymmetric between the positive area and the negative area of the first signal S1.

The switch unit 42 generates a fourth signal S42 by, based on the signal level of the input image signal $S_{in}$, selecting one of the first signal S1 and the second signal S2 for each pixel. Here, as described above, it is easier for humans to perceive an outline in a low luminance area than an outline in the high luminance area. However, an outline in a particularly low luminance area is equivalent to what is called noise, and it is not preferable to enhance the noise. Also, when an outline in a high luminance area is enhanced, a value is saturated and diverges due to amplification, causing glare of the image. Accordingly, in order to further enhance the outline in the low luminance area while suppressing generation of the noise, the switch unit 42, for pixels with signal levels (luminance) between the predetermined upper limit and the predetermined lower limit, selects the second signal S2 as the fourth signal S42 as illustrated in FIG. 11(D), for example. Also, for pixels with signal levels (luminance) out of the range between the predetermined upper limit and the predetermined lower limit, the switch unit 42 selects the first signal S1 illustrated in FIG. 11(B) as the fourth signal S42, in order to prevent saturation and divergence of the value due to the amplification and enhancement of the noise. For example, when the input image signal $S_{in}$ is an 8 bit signal, for pixels with a signal level between 32 (the lower limit) and 192 (the upper limit), the switch unit 42 outputs the second signal S2 from the nonlinear processing unit 20 as the fourth signal S42 to the limiter 31. For pixels with signal levels between 0 and 31, which is under the lower limit, and pixels with signal levels between 193 and 255, which is higher than the upper limit, the switch unit 42 outputs the first signal S1 as the fourth signal S42 to the limiter 31.

The limiter 31 generates the third signal S31 by adjusting the fourth signal S42, and the adder 50 generates the output image signal $S_{out}$ by adding the third signal S31 as the compensation signal for the image sharpening to the input image signal $S_{in}$.

According to the present embodiment, as described above, the nonlinear processing unit 20 generates the second signal S2 by carrying out the asymmetric nonlinear processing to the first signal S1; the switch unit 42 generates the fourth signal S42 by selecting one of the first signal S1 and the second signal S2 for each pixel based on the signal level of the input image signal $S_{in}$; the limiter 31 generates the third signal S31 by adjusting the fourth signal S42; and the adder 50 generates the output image signal $S_{out}$ representing the output image by adding the third signal S31 to the input image signal $S_{in}$. Accordingly, without repetitive operations to a plurality of frames, an image may be sharpened by using a frequency component higher than the Nyquist frequency.

In particular, the switch unit 42, based on the signal level of the input image signal $S_{in}$, selects one of the first signal S1 and the second signal S2 for each pixel. That is, whether asymmetric nonlinear processing is suitable may be determined for each pixel of the input image, such as for a low luminance area of the input image, thus image enhancement processing suitable for each area may be carried out.

For example, the switch unit 42, for a pixel with the signal level within the range between the predetermined upper limit and the predetermined lower limit, generates the third signal S3 by selecting the second signal S2. Thereby, the image enhancement processing conforming to the human perception characteristics that it is easier for the human to perceive an outline in a low luminance area than an outline in a high luminance area may be carried out while suppressing enhancement of the noise.

Note that, although the third embodiment has a configuration in which the area filter 60 is added to the configuration of the second embodiment, the area filter 60 may be added to the configuration of the fourth embodiment. In this case, the switch unit 42 generates the fourth signal S42 by selecting one of the first signal S1 and the second signal S2 based on the average signal level of each pixel of the input image average signal $S_{in\_ave}$. According to this embodiment, the switch unit 42 generates the fourth signal S42 based on the average signal level of each pixel, as opposed to the signal level of each pixel of the input image signal $S_{in}$. Since the average signal level functions as the average value of the signal levels of the predetermined area including the surrounding pixels, a possibility to differently select the first signal S1 or the second signal S2 between adjacent pixels is reduced, which enables suppression of occurrence of flickering on the display. Also, the switch unit 42, by maintaining selection of the first signal S1 or the second signal S2 for the predetermined area, for example, for a predetermined period, may further suppress occurrence of flickering on the display.

INDUSTRIAL APPLICABILITY

The present invention is employed by the image enhancing device for improving image quality by sharpening an image and may be employed by the image enhancing device for sharpening a video displayed in real time on a television (TV) set, for example.

Also, the present invention may be used for image enhancement processing of a surveillance camera and, for example, enables reduction of a blur generated at a magnified portion of an image. Further, the present invention enables the image enhancement processing to an image taken by the surveillance camera installed at a dark position or an image taken at nighttime by further sharpening an outline in a low luminance area.

Moreover, the present invention is applicable to improve a resolution of a video recorded from a distance. For example, the image enhancement processing to sharpen an outline may be carried out to an image of an accident site, where it is difficult to access, taken from a distance or to a satellite image.

Further, the present invention is applicable to definition-enhancement of analogue contents. That is, when converting existent analogue contents into high-vision contents, by carrying out image enhancement processing for sharpening an outline of an up-converted image, the analogue contents may be reproduced as higher definition digital contents. The present invention is applicable when, for example, analogue contents are converted into high-vision contents or when contents of an old movie are converted into higher definition digital contents (for example, Blu-ray (registered trademark) contents).

The present invention is also applicable to a medical field. For example, an enlarged endoscopic image of an affected area may be converted into a higher definition image. Also, for a distance treatment, a low resolution image of an affected area may be converted into a higher definition image.

Furthermore, the present invention is applicable to definition-enhancement of video contents that may be reproduced on a computer. On the internet, there are multiple websites that deliver video contents, and a great number of video contents have been stored. Application of the present invention allows existent video contents to be converted into higher resolution contents at higher definition, thus improving viewing quality.

Although the present invention has been described based on the figures and the embodiments, it is to be understood that various modifications and changes may be implemented based on the present disclosure by those skilled in the art. Accordingly, such modifications and changes are included in a scope of the present invention. For example, a function and the like included in each element or each step may be rearranged avoiding logical contradiction, such that a plurality of elements or steps are combined or divided.

REFERENCE SIGNS LIST 1, 2, 3 image enhancing device
10 HPF (high-pass filter: filter unit)
111-11(m−1) unit delay element
121-12m multiplier
131 adder
11 LPF (low-pass filter)
12 subtracter
20, 23 nonlinear processing unit
21 first processing unit
22 second processing unit
30, 31 limiter
40, 41, 42 switch unit
50 adder
60 area filter

The invention claimed is:

1. An image enhancing device for generating an output image by sharpening an input image, comprising:
  a filter, implemented by a processor, configured to generate a first signal by eliminating at least a direct current component of a frequency component included in an input image signal representing the input image;
  a nonlinear processing unit, implemented by the processor, configured to generate a second signal by carrying out, to the first signal, nonlinear processing asymmetric between a positive area and a negative area of the first signal, wherein the nonlinear processing is a power operation, wherein power indexes of the power operation used in the positive area and the negative area of the first signal are different from each other, wherein the power indexes are not equal to 1, and wherein the nonlinear processing applied to the positive area of the first signal and the nonlinear processing applied to the negative area of the first signal are expressed by continuous functions passing through an origin;
  a limiter, implemented by the processor, configured to generate a third signal by adjusting the second signal; and
  an adder, implemented by the processor, configured to generate an output image signal representing the output image by adding the third signal to the input image signal.

2. The image enhancing device according to claim 1, further comprising a switch, wherein
  the nonlinear processing unit is configured to generate a plurality of types of second signals by carrying out, to the first signal, a plurality of types of nonlinear processing having continuous functions different from one another and are asymmetric between the positive area and the negative area of the first signal,
  the switch is configured to generate a fourth signal by selecting, for each pixel, one second signal conforming to human perception characteristics from the plurality of types of second signals based on a signal level of the input image signal, and
  the limiter is configured to generate the third signal by adjusting the fourth signal.

3. The image enhancing device according to claim 2, wherein the switch, for a pixel with a signal level equal to or lower than a predetermined value, is configured to generate the fourth signal by selecting a second signal with a larger signal level change rate in the positive area than in the negative area of the first signal from the plurality of types of second signals.

4. The image enhancing device according to claim 3, wherein the switch, for a pixel with a signal level higher than the predetermined value, is configured to generate the fourth signal by selecting a second signal with a larger signal level change rate in the negative area than in the positive area of the first signal from the plurality of types of second signals.

5. The image enhancing device according to claim 4, further comprising an area filter, implemented by the processor, configured to calculate, for each pixel of the input image signal, an average signal level of a predetermined area including surrounding pixels, wherein
  the switch is configured to generate the fourth signal based on the average signal level of each of the pixels, in place of the signal level of the each of the pixels.

6. The image enhancing device according to claim 3, further comprising an area filter, implemented by the processor, configured to calculate, for each pixel of the input image signal, an average signal level of a predetermined area including surrounding pixels, wherein
  the switch is configured to generate the fourth signal based on the average signal level of each of the pixels, in place of the signal level of the each of the pixels.

7. The image enhancing device according to claim 2, wherein the switch, for a pixel with a signal level higher than a predetermined value, is configured to generate the fourth signal by selecting a second signal with a larger signal level change rate in the negative area than in the positive area of the first signal from the plurality of types of second signals.

8. The image enhancing device according to claim 7, further comprising an area filter, implemented by the processor, configured to calculate, for each pixel of the input image signal, an average signal level of a predetermined area including surrounding pixels, wherein
  the switch is configured to generate the fourth signal based on the average signal level of each of the pixels, in place of the signal level of the each of the pixels.

9. The image enhancing device according to claim 2, further comprising an area filter, implemented by the processor, configured to calculate, for each pixel of the input image signal, an average signal level of a predetermined area including surrounding pixels, wherein
  the switch is configured to generate the fourth signal based on the average signal level of each of the pixels, in place of the signal level.

10. The image enhancing device according to claim 1, further comprising a switch, wherein
  the switch is configured to select one of the first signal and the second signal for each pixel based on the signal level of the input image signal and, for a pixel with a signal level within a range between a predetermined upper limit and a predetermined lower limit, is configured to generate a fourth signal by selecting the second signal, and
  the limiter is configured to generate the third signal by adjusting the fourth signal.

11. The image enhancing device according to claim 10, further comprising an area filter, implemented by the processor, configured to calculate, for each pixel of the input image signal, an average signal level of a predetermined area including surrounding pixels, wherein
  the switch is configured to generate the fourth signal based on the average signal level of each of the pixels, in place of the signal level of the each of the pixels.

12. An image enhancement method used by an image enhancing device for generating an output image by sharpening an input image, including:
   a step of generating a first signal by eliminating at least a direct current component of a frequency component included in an input image signal representing the input image;
   a nonlinear processing step of generating a second signal by performing, to the first signal, nonlinear processing asymmetric between a positive area and a negative area of the first signal, wherein the nonlinear processing is a power operation, wherein power indexes of the power operation used in the positive area and the negative area of the first signal are different from each other, wherein the power indexes are not equal to 1, and wherein the nonlinear processing applied to the positive area of the first signal and the nonlinear processing applied to the negative area of the first signal are expressed by continuous functions passing through an origin;
   an adjustment step of generating a third signal by adjusting the second signal; and
   a step of generating an output image signal representing the output image by adding the third signal to the input image signal.

13. The image enhancement method according to claim 12, further including a switchover step, wherein
   at the nonlinear processing step, a plurality of types of second signals are generated by carrying out, to the first signal, a plurality of types of nonlinear processing having continuous functions different from one another and asymmetric between the positive area and the negative area of the first signal,
   at the switchover step, a fourth signal is generated by selecting, for each pixel, one second signal conforming to human perception characteristics from the plurality of second signals based on a signal level of the input image signal, and
   at the adjustment step, the third signal is generated by adjusting the fourth signal.

14. The image enhancement method according to claim 13, wherein at the switchover step, for a pixel with a signal level equal to or lower than a predetermined value, the fourth signal is generated by selecting, from the plurality of types of second signals, a second signal with a larger signal level change rate in the positive area than in the negative area of the first signal.

15. The image enhancement method according to claim 14, wherein at the switchover step, for a pixel with a signal level higher than the predetermined value, the fourth signal is generated by selecting, from the plurality of types of second signals, a second signal with a larger signal level change rate in the negative area than in the positive area of the first signal.

16. The image enhancement method according to claim 15, further including a step of calculating, for each pixel of the input image signal, an average signal level of a predetermined area including surrounding pixels, wherein
   at the switchover step, the fourth signal is generated based on the average signal level of each of the pixels, in place of the signal level of the each of the pixels.

17. The image enhancement method according to claim 14, further including a step of calculating, for each pixel of the input image signal, an average signal level of a predetermined area including surrounding pixels, wherein
   at the switchover step, the fourth signal is generated based on the average signal level of each of the pixels, in place of the signal level of the each of the pixels.

18. The image enhancement method according to claim 13, wherein at the switchover step, for a pixel with a signal level higher than a predetermined value, the fourth signal is generated by selecting, from the plurality of types of second signals, a second signal with a larger signal level change rate in the negative area than in the positive area of the first signal.

19. The image enhancement method according to claim 18, further including a step of calculating, for each pixel of the input image signal, an average signal level of a predetermined area including surrounding pixels, wherein
   at the switchover step, the fourth signal is generated based on the average signal level of each of the pixels, in place of the signal level of the each of the pixels.

20. The image enhancement method according to claim 13, further including a step of calculating, for each pixel of the input image signal, an average signal level of a predetermined area including surrounding pixels, wherein
   at the switchover step, the fourth signal is generated based on the average signal level of each of the pixels, in place of the signal level.

21. The image enhancement method according to claim 12, further including a switchover step, wherein
   at the switchover step, the first signal or the second signal is selected for each pixel based on a signal level of the input image signal, and a fourth signal is generated by selecting the second signal for a pixel with a signal level within a range between a predetermined upper limit and a predetermined lower limit, and
   at the adjustment step, the third signal is generated by adjusting the fourth signal.

22. The image enhancement method according to claim 21, further including a step of calculating, for each pixel of the input image signal, an average signal level of a predetermined area including surrounding pixels, wherein
   at the switchover step, the fourth signal is generated based on the average signal level of each of the pixels, in place of the signal level of the each of the pixels.

* * * * *